United States Patent [19]
Chung et al.

[11] Patent Number: 5,250,094
[45] Date of Patent: Oct. 5, 1993

[54] CERAMIC FILTER CONSTRUCTION AND METHOD

[75] Inventors: H. Young Chung, Bloomington; Keh B. Dema, Burnsville; Marty A. Barris, Lakeville, all of Minn.

[73] Assignee: Donaldson Company, Inc., Minneapolis, Minn.

[21] Appl. No.: 851,327

[22] Filed: Mar. 16, 1992

[51] Int. Cl.⁵ .................................... B01D 27/06
[52] U.S. Cl. ................................. 55/523; 55/524; 55/527; 55/DIG. 30
[58] Field of Search ................. 55/523, DIG. 30, 527, 55/524

[56] References Cited

U.S. PATENT DOCUMENTS

| | | |
|---|---|---|
| 2,600,262 | 6/1952 | Powers . |
| 2,699,707 | 1/1955 | Bezborodko . |
| 2,731,541 | 1/1956 | Houdry et al. . |
| 2,738,854 | 3/1956 | Thrower . |
| 2,821,261 | 1/1958 | Vixler .................... 55/527 |
| 2,900,483 | 8/1959 | Welch . |
| 3,043,096 | 7/1962 | McLoughlin . |
| 3,180,712 | 4/1965 | Hamblin . |
| 3,364,661 | 1/1968 | Maaherz et al. ........ 55/527 |
| 3,399,516 | 9/1968 | Hough, Jr. et al. . |
| 3,499,269 | 3/1970 | Bois . |
| 3,696,666 | 10/1972 | Johnson et al. . |
| 3,723,070 | 3/1973 | Houdry . |
| 3,754,619 | 8/1973 | McCormick . |
| 3,771,315 | 11/1973 | Scott . |
| 3,775,064 | 11/1973 | Berger et al. . |
| 3,783,619 | 1/1974 | Alquist . |
| 3,937,015 | 2/1976 | Akado et al. . |
| 3,954,672 | 5/1976 | Somers et al. . |
| 3,966,419 | 6/1976 | Bloomfield . |
| 4,147,230 | 4/1979 | Ormond et al. . |
| 4,158,037 | 6/1979 | Aoyama . |

(List continued on next page.)

FOREIGN PATENT DOCUMENTS

| | | |
|---|---|---|
| 495606 | 8/1953 | Canada . |
| 0050340 | 4/1982 | European Pat. Off. . |
| 0158625 | 10/1985 | European Pat. Off. . |
| 0183066 | 6/1986 | European Pat. Off. . |
| 0220484 | 5/1987 | European Pat. Off. . |
| 0220505A2 | 5/1987 | European Pat. Off. . |
| 0275372A1 | 7/1988 | European Pat. Off. . |
| 2166191 | 8/1973 | Fed. Rep. of Germany . |
| 2222663 | 12/1973 | Fed. Rep. of Germany . |
| 2627597 | 12/1977 | Fed. Rep. of Germany . |
| 3112870A1 | 11/1982 | Fed. Rep. of Germany . |
| 3529684A1 | 2/1987 | Fed. Rep. of Germany . |
| 3638203A1 | 5/1988 | Fed. Rep. of Germany . |

(List continued on next page.)

OTHER PUBLICATIONS

SAE Technical Paper Series 840074, Design Considerations for Mounting Material for Ceramic Wall-Flow Diesel Filters, Suresh T. Galati, Corning Glass Works and Richard P. Merry, 3M-Company, International Congress & Exposition, Feb. 27-Mar. 2, 1984, pp. 25-34.

Article 840174, Particulate Control Technology and Particulate Standards for Heavy Duty Diesel Engines, Christopher S. Weaver, Energy & Resource Consultant, pp. 109-125.

Article 850014, Advanced Techniques for Thermal and Catalytic Diesel Particulate Trap Regeneration, V. D. Rao, J. E. White, W. R. Wade, M. G. Aimone, and H. A. Cikanek, Research Staff Ford Motor Company, pp. 57-73.

(List continued on next page.)

*Primary Examiner*—Tim Miles
*Attorney, Agent, or Firm*—Merchant, Gould, Smith, Edell, Welter & Schmidt

[57] ABSTRACT

A ceramic fiber filter media is provided which includes ceramic fiber material and an effective amount of fluid fiber material. Preferably the media also contains therein thermoconductive fiber component. Embodiments are illustrated wherein the ceramic fiber filter media is incorporated into a preferred filter element. Particulate trap systems corporating such filter elements therein are described.

13 Claims, 5 Drawing Sheets

U.S. PATENT DOCUMENTS

| | | |
|---|---|---|
| 4,167,852 | 9/1979 | Ludecke . |
| 4,211,075 | 7/1980 | Ludecke et al. . |
| 4,212,657 | 7/1980 | Urbinati . |
| 4,248,833 | 2/1981 | Aoyama . |
| 4,250,146 | 2/1981 | Bailey . |
| 4,264,344 | 4/1981 | Ludecke et al. . |
| 4,270,936 | 6/1981 | Mann . |
| 4,273,879 | 6/1981 | Langer et al. . |
| 4,276,066 | 6/1981 | Bly et al. . |
| 4,276,071 | 6/1981 | Outland . |
| 4,281,512 | 8/1981 | Mills . |
| 4,319,896 | 3/1982 | Sweeney . |
| 4,342,574 | 8/1982 | Fetzer . |
| 4,346,557 | 8/1982 | Shadman et al. . |
| 4,361,206 | 11/1982 | Tsai . |
| 4,364,210 | 12/1982 | Fleming et al. . |
| 4,373,330 | 2/1983 | Stark . |
| 4,386,497 | 6/1983 | Takagi et al. . |
| 4,404,795 | 9/1983 | Oishi et al. . |
| 4,404,796 | 9/1983 | Wade . |
| 4,415,344 | 11/1983 | Frost et al. . |
| 4,416,675 | 11/1983 | Montierth . |
| 4,416,676 | 11/1983 | Montierth . |
| 4,417,908 | 11/1983 | Pitcher, Jr. . |
| 4,419,113 | 12/1983 | Smith . |
| 4,420,316 | 12/1983 | Frost et al. . |
| 4,426,844 | 1/1984 | Nakano . |
| 4,427,418 | 1/1984 | Kogiso et al. . |
| 4,428,758 | 1/1984 | Montierth . |
| 4,436,535 | 3/1984 | Erdmannsdörfer et al. . |
| 4,450,682 | 5/1984 | Sato et al. . |
| 4,455,823 | 6/1984 | Bly et al. . |
| 4,456,457 | 6/1984 | Nozawa et al. . |
| 4,478,618 | 10/1984 | Bly et al. .............................. 55/523 |
| 4,485,622 | 12/1984 | Takagi et al. . |
| 4,492,079 | 1/1985 | Takagi et al. . |
| 4,494,375 | 1/1985 | Rao et al. . |
| 4,504,294 | 3/1985 | Brighton . |
| 4,505,106 | 3/1985 | Frankenberg et al. . |
| 4,505,107 | 3/1985 | Yamaguchi et al. . |
| 4,506,505 | 3/1985 | Melzer . |
| 4,509,327 | 4/1985 | Enga . |
| 4,509,966 | 4/1985 | Dimick et al. . |
| 4,512,147 | 4/1985 | Wong . |
| 4,512,786 | 4/1985 | Sakurai et al. . |
| 4,512,847 | 4/1985 | Brunsch et al. . |
| 4,516,993 | 5/1985 | Takeuchi et al. . |
| 4,519,820 | 5/1985 | Oyobe et al. . |
| 4,523,935 | 6/1985 | Takagi et al. . |
| 4,531,363 | 7/1985 | Ludecke et al. . |
| 4,535,588 | 8/1985 | Sato et al. . |
| 4,535,589 | 8/1985 | Yoshida et al. . |
| 4,538,411 | 9/1985 | Wade et al. . |
| 4,538,412 | 9/1985 | Oishi et al. . |
| 4,544,388 | 10/1985 | Rao et al. . |
| 4,548,625 | 10/1985 | Ishida et al. . |
| 4,556,457 | 12/1985 | McCord . |
| 4,558,565 | 12/1985 | Kojima et al. . |
| 4,559,193 | 12/1985 | Ogawa et al. . |
| 4,560,478 | 12/1985 | Narumiya . |
| 4,562,695 | 1/1986 | Rao et al. . |
| 4,573,317 | 3/1986 | Ludecke . |
| 4,574,589 | 3/1986 | Hasegawa et al. . |
| 4,578,091 | 3/1986 | Borja . |
| 4,581,891 | 4/1986 | Usui et al. . |
| 4,597,262 | 7/1986 | Retallick . |
| 4,604,868 | 8/1986 | Nomoto et al. . |
| 4,604,869 | 8/1986 | Yoshida et al. . |
| 4,608,640 | 8/1986 | Shinzawa et al. . |
| 4,610,138 | 9/1986 | Shinzawa et al. . |
| 4,615,173 | 10/1986 | Usui et al. . |
| 4,622,051 | 11/1986 | Polach et al. . |
| 4,625,511 | 12/1986 | Scheitlin et al. . |
| 4,629,483 | 12/1986 | Stanton . |
| 4,630,438 | 12/1986 | Shinzawa . |
| 4,631,076 | 12/1986 | Kurihara et al. . |
| 4,632,216 | 12/1986 | Wagner et al. . |
| 4,634,459 | 1/1987 | Pischinger et al. . |
| 4,641,496 | 2/1987 | Wade . |
| 4,643,749 | 2/1987 | Miura . |
| 4,651,524 | 3/1987 | Brighton . |
| 4,652,286 | 3/1987 | Kusuda et al. . |
| 4,655,037 | 4/1987 | Rao . |
| 4,656,832 | 4/1987 | Yukihisa et al. . |
| 4,659,348 | 4/1987 | Mayer . |
| 4,662,911 | 5/1987 | Hirayma et al. . |
| 4,663,934 | 5/1987 | Sickels . |
| 4,667,469 | 5/1987 | Abthoff et al. . |
| 4,669,261 | 6/1987 | Wörner et al. . |
| 4,670,020 | 6/1987 | Rao . |
| 4,671,058 | 6/1987 | Yoshida et al. . |
| 4,671,059 | 6/1987 | Lawson . |
| 4,672,809 | 6/1987 | Cornelison et al. . |
| 4,678,827 | 7/1987 | Itoh et al. . |
| 4,685,291 | 8/1987 | Ha . |
| 4,686,826 | 8/1987 | Koshoffer et al. . |
| 4,686,827 | 8/1987 | Wade et al. . |
| 4,687,579 | 8/1987 | Bergman .............................. 55/523 |
| 4,693,338 | 9/1987 | Clerc . |
| 4,695,300 | 9/1987 | Takagi . |
| 4,695,301 | 9/1987 | Okajima et al. . |
| 4,704,863 | 11/1987 | Abthoff et al. . |
| 4,709,547 | 12/1987 | Pischinger et al. . |
| 4,709,549 | 12/1987 | Lepperhoff . |
| 4,718,926 | 1/1988 | Nakamoto et al. . |
| 4,720,972 | 1/1988 | Rao et al. . |
| 4,723,069 | 2/1988 | Hoshizaki et al. . |
| 4,730,454 | 3/1988 | Pischinger et al. . |
| 4,732,593 | 3/1988 | Kondo et al. . |
| 4,732,594 | 3/1988 | Mizrah et al. . |

(List continued on next page.)

U.S. PATENT DOCUMENTS

| | | |
|---|---|---|
| 4,744,216 | 5/1988 | Rao et al. |
| 4,744,217 | 5/1988 | Goerlich et al. |
| 4,752,516 | 6/1988 | Montierth |
| 4,783,958 | 11/1988 | Borja |
| 4,788,819 | 12/1988 | Henkel |
| 4,791,785 | 12/1988 | Hudson et al. |
| 4,810,273 | 3/1989 | Komoda |
| 4,829,766 | 5/1989 | Henkel |
| 4,832,661 | 4/1989 | Wagner et al. |
| 4,851,015 | 7/1989 | Wagner et al. |
| 4,857,088 | 8/1989 | Mizrah et al. |
| 4,867,768 | 9/1989 | Wagner et al. |
| 4,871,495 | 10/1989 | Helferich et al. |
| 4,872,889 | 10/1989 | Lepperhoff et al. |
| 4,875,336 | 10/1989 | Hayashi et al. |
| 4,878,928 | 11/1989 | Wagner et al. |
| 4,881,959 | 11/1989 | Kono et al. |
| 4,890,455 | 1/1990 | Leonhard et al. |
| 4,897,096 | 1/1990 | Pischinger et al. |
| 4,899,540 | 2/1990 | Wagner et al. |
| 4,916,897 | 4/1990 | Hayashi et al. |
| 4,961,314 | 10/1990 | Howe et al. |
| 4,974,414 | 12/1990 | Kono et al. |
| 4,975,099 | 12/1990 | Kaser et al. |
| 4,976,929 | 12/1990 | Cornelison et al. |
| 4,986,069 | 1/1991 | Barris et al. |
| 5,009,065 | 4/1991 | Howe et al. |
| 5,014,511 | 5/1991 | Wade et al. |
| 5,024,054 | 6/1991 | Barris et al. |
| 5,044,157 | 9/1991 | Henkel ............................ 55/466 |
| 5,052,178 | 10/1981 | Clerc et al. |
| 5,053,062 | 10/1991 | Barris et al. |
| 5,053,603 | 10/1991 | Wagner et al. |
| 5,101,095 | 3/1992 | Wagner et al. |

FOREIGN PATENT DOCUMENTS

| | | |
|---|---|---|
| 4004424A1 | 8/1990 | Fed. Rep. of Germany. |
| 8221943 | 6/1984 | France. |
| 8614398 | 5/1988 | France. |
| 58-158310 | 9/1983 | Japan. |
| 58-210310 | 12/1983 | Japan. |
| 59-90713 | 5/1984 | Japan. |
| 60-22016 | 2/1985 | Japan. |
| 60-125714 | 7/1985 | Japan. |
| 62-159272 | 4/1989 | Japan. |
| 62-176334 | 5/1989 | Japan. |
| WO85/02785 | 7/1985 | PCT Int'l Appl. |
| WO89/01566 | 2/1989 | PCT Int'l Appl. |
| 2012183 | 7/1979 | United Kingdom. |
| 2134407 | 8/1984 | United Kingdom. |

OTHER PUBLICATIONS

Article 850152, Electrical Regeneration of Ceramic Wall-Flow Diesel Filters for Underground Mining Applications, H. C. Vergeer, Ontario Research Foundation, S. T. Galati, Corning Glass Works, J. P. Morgan & E. D. Dainty, Canada Centre for Mineral & Energy Technology (CANMET), pp. 143–151.

Article 860290, Study on Catalytic Regeneration of Ceramic Diesel Particulate Filter, Yoshinori Niura, Kenji Ohkubo, and Kunihiro Yagi, Technical Research Center Mazda Motor Corp., pp. 163–172.

Article 870012, Development and Selection of Diesel Particulate Trap Regeneration Systems, Minoru Arai, Shoichiro Miyashita, and Kaoru Sato, First Light Duty Engine Engineering Department Isuzu Motors Ltd., Japan, pp. 27–36.

Donaldson Drawing 5215894.

Corning Ceramics Diesel Filter Product Data Brochure, Corning, Industrial Ceramics Department, Corning Ceramics, Corning Glass Works, August 1985.

Thermal Stresses During Successful Regeneration of the Large, Segmented, EX-47 Filter using Electrical Coil Face Heater, S. T. Gulati, Corning Glass Works, Dec. 22, 1983.

Electrical Regeneration of Creamic Wall-Flow Diesel Filters for Underground Mining Application, S. T. Gulati, et al., Corning Glass Works, Jan. 8, 1985.

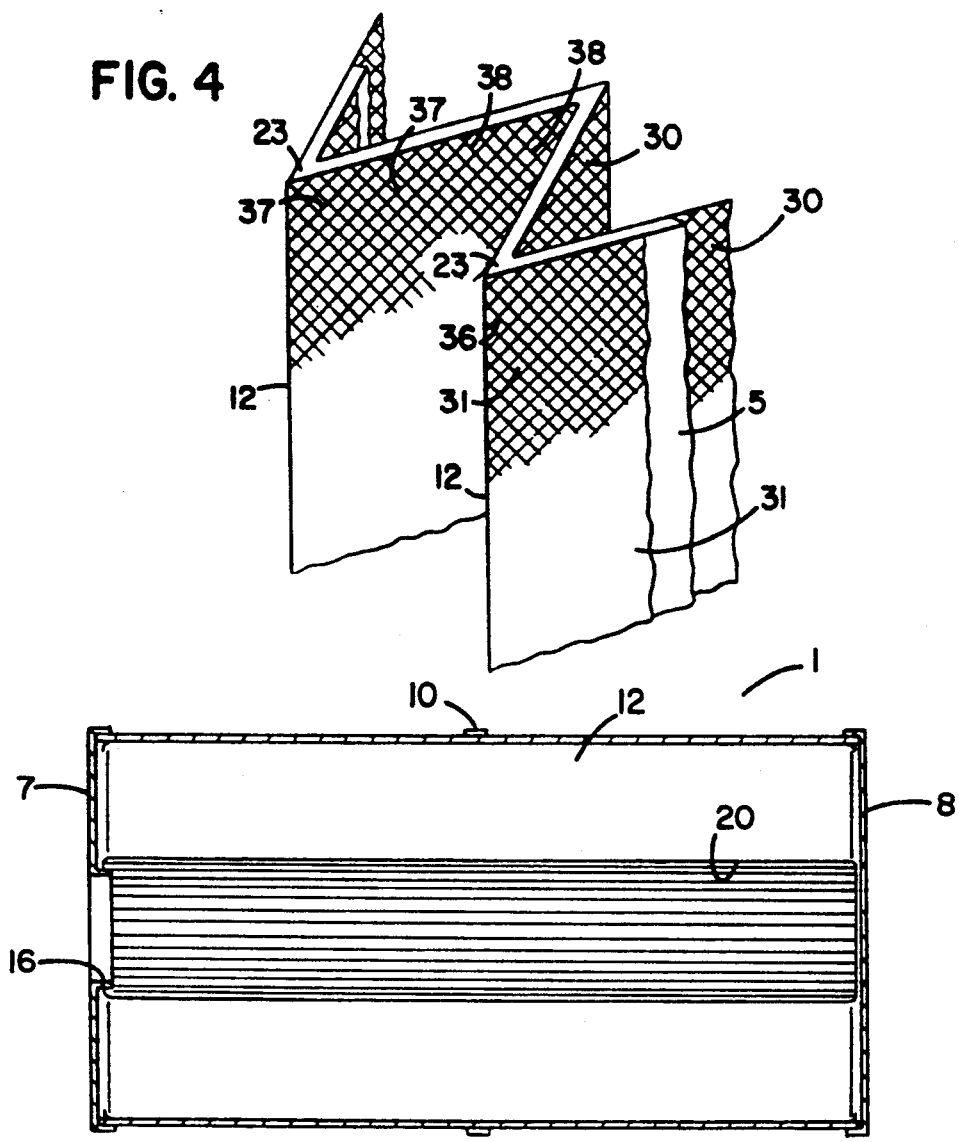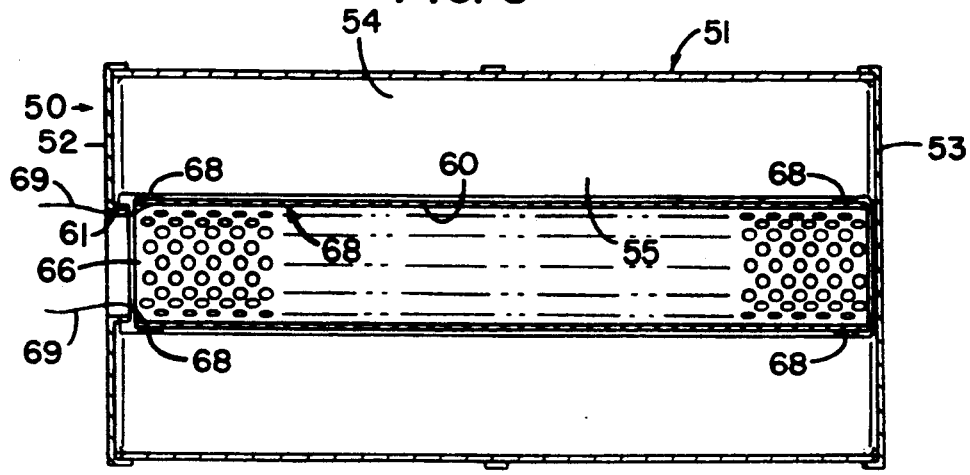

CERAMIC FILTER CONSTRUCTION AND METHOD

FIELD OF THE INVENTION

The present invention relates to ceramic fiber filter elements and their use. It particularly concerns applications wherein such elements are exposed to extreme conditions during use. In certain applications, the invention concerns the construction of such arrangements in a pliable form, in particular in a pleated form. The invention also concerns utilization of such arrangements in particulate trap systems.

BACKGROUND OF THE INVENTION

Ceramic fiber filter constructions are known. One such system is described in Kusuda et al., U.S. Pat. No. 4,652,286, the disclosure of which is incorporated herein by reference. The Kusuda et al. arrangement comprises a porous sintered ceramic fiber composite sheet, coiled into a honeycomb, corrugated, structure. The ceramic fiber composite is produced by a paper-forming method, from a slurry of alumino-silicate fibers and fire clay. After the structure is formed, it is fired and hardened. Such a system is usable as a filter for relatively high temperature gases, at least up to about 1000° C., in a generally efficient and effective manner.

A problem with such fired ceramic fiber filter constructions is that they are relatively brittle. Thus, they exhibit some propensity to fracture or crumble under stresses of certain uses.

Another problem with conventional fired ceramic fiber filter constructions is that they are subject to some problems when used under conditions of substantial thermal gradients. That is, they act as insulators, with formation of substantial thermal gradients across their structures. Since one portion of the arrangement tends to expand under applied thermal stress, more greatly than another, due to the structure's insulating character the relatively rigid construction will have somewhat of a propensity to fracture or fragment under thermal stress.

At least for these reasons, conventional ceramic fiber filter constructions have not been completely satisfactory for certain applications, especially those wherein the filter will be subject to wide temperature variations, and thus expansion and contraction, during use. In addition, they have not been fully acceptable as systems subject to substantial vibration or shock, due to their relatively brittle nature.

In addition, in some systems it is desirable to utilize a pliable, i.e., not completely rigid, filter construction. Conventional ceramic fiber constructions have not have been acceptable for such applications, due to their rigidity.

SUMMARY OF THE INVENTION

According to the present invention there is provided a fiber filter media including ceramic fiber material and an effective amount of fluid fiber material. Preferably, the arrangement also includes an effective amount of thermoconductive fiber component therein.

In the preferred embodiment, the thermal conductive fiber component comprises a metallic fiber material having a thermal conductivity of at least 5.0 Btu/ft hr °F.; the metallic fiber material is preferably steel fiber material.

For preferred embodiments, the fluid fiber material comprises glass fiber material. Such material adds strength and flexibility to the system, through an extended temperature range.

In preferred applications, the filter media comprises a ceramic fiber filter element including, by weight percent of total fiber material present: 50-98% ceramic fiber material; 10-50% fluid (preferably glass) fiber material; and, 2-50% thermoconductive (preferably metallic) fiber material. In certain applications, the material may be rendered substantially rigid by the inclusion of fire clay within the construction. In other applications, the filter media may be oriented in a flexible configuration, such as a flexible, pleated construction.

In one embodiment of the preferred constructions provided, the preferred filter media identified above is oriented in a cylindrical construction having external and internal surfaces and comprising a plurality of flexible pleats defining an internal flow passageway and having longitudinal pleats or pleat ridges. In certain preferred applications, such a construction is provided with a porous support liner oriented adjacent at least one of the external internal surfaces. In the preferred application, the porous support liner comprises a wire screen having a plurality of parallel longitudinal wires, the wires being oriented to extend generally in an acute angle to the longitudinal pleats or pleat ridges of the filter media cylindrical extension.

A typical preferred construction includes first and second end caps thereon, one of which is closed, the other of which has a flow passageway therethrough. In some applications, a pleat spacer, oriented to selectively position and space pleats, may be oriented on the cylindrical extension, at a position between the first and second end caps.

Also according to the present invention, an advantageous exhaust system particulate trap assembly is provided, which includes a pleated ceramic fiber filter element preferably as described. In one preferred embodiment described and shown, a plurality of such elements are included in a single particulate trap.

BRIEF DESCRIPTION OF THE DRAWINGS

FIG. 3 is a cross-sectional view taken along lines 3—3, FIG. 1.

FIG. 4 is enlarged fragmentary view of a portion of the filter element illustrated in FIG. 1.

FIG. 5 is a cross-sectional schematic view of a filter element such as that illustrated in FIG. 1, taken from a point of view analogous to that illustrated in FIG. 3, and shown fitted with an internal heater element.

DETAILED DESCRIPTION OF THE INVENTION

Figure 1:
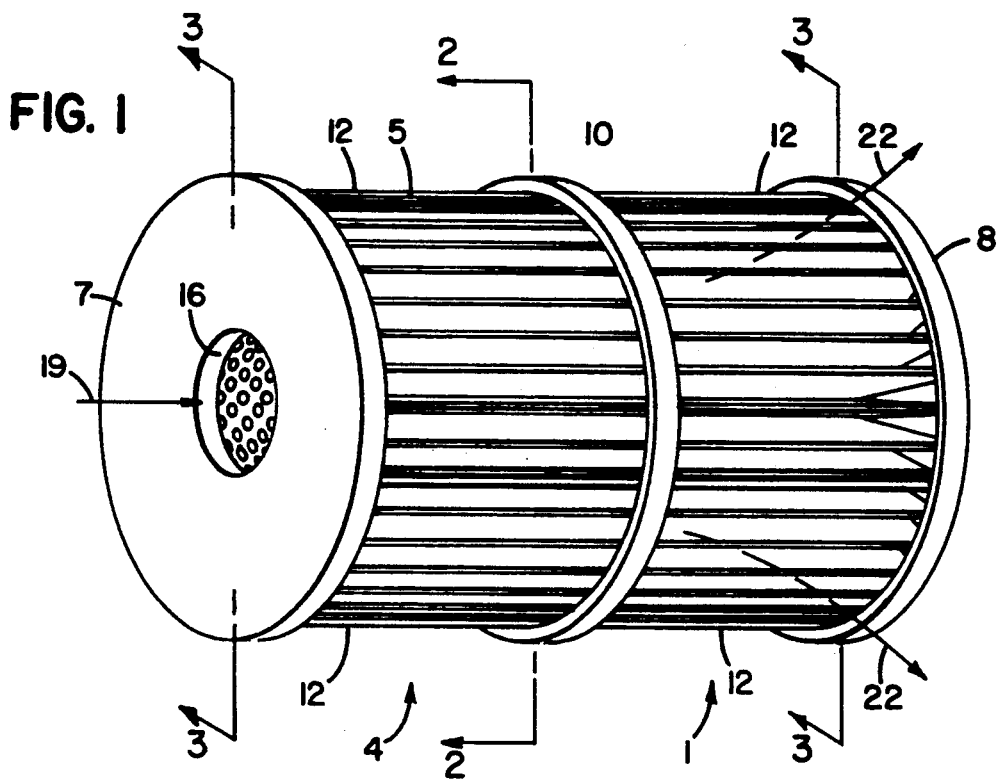
FIG. 1 is a perspective view of a filter element according to the present invention.

The following detailed descriptions are intended to be exemplary of the principles, and applications of the principles, of the present invention. The invention may be applied in a wide variety of forms and applications.

The present invention concerns several matters. First, it concerns preferred ceramic fiber filter constructions and methods of their preparation. In addition, it concerns advantageous assemblies or arrangements having filter elements therein, in part facilitated by the advantageous construction of the filter element provided. Further, it concerns preferred methods of filtering, facilitated by the versatility of certain arrangements according to the present invention.

The Filter Media

As previously indicated, the present invention concerns provision of preferred filter media. Certain applications of the present invention concern the provision of a pliable ceramic fiber filter element. In addition, advantages can be provided by applying certain principles of the present invention to modification of more conventional, fired, rigid ceramic fiber filter elements.

A. Pliable Ceramic Fiber Filter Elements

According to the present invention, a pliable ceramic fiber filter construction is provided. The pliable construction comprises a ceramic fiber filter component prepared without the provision of fire clay therein, and without firing. Thus, it is not rendered in a rigid, brittle, state. The ceramic fiber filter construction is rendered strong, over a relatively wide temperature range, by the provision therein of an effective amount of a fluid fiber material. Preferably, the fluid fiber material is glass fiber material. The glass fibers lend ductility and strength to the filter construction. In addition, they facilitate resistance to crumbling under thermal shock, since glass does not tend to fracture with increases in temperature, but rather it acts, due to its fluid nature, as somewhat of a shock absorbing or dampening medium. Herein the term "fluid fiber material" in this context is meant to refer to a fiber material, such as fiber glass, which exhibits fluid-like properties under increased temperatures during use; i.e. it is very viscous, but somewhat flowable. The term "pliable" in this context is meant to refer to a construction which can be bent or flexed somewhat, without breaking.

In this context the term "effective amount" refers to a sufficient amount of glass (fluid) fiber material relative to ceramic fiber material in order to result in an arrangement which has enhanced strength flexibility and/or performance over a wide range of temperatures, relative to a system in which no glass (fluid) fiber is provided. Preferred constructions, and preferred relative amounts of ceramic fiber and glass fiber material in a construction, are described in detail below.

Preferred embodiments of the present invention also include therein an effective amount of a heat conductor (thermoconductor) component. The provision of this component comprises the provision of a fibrous material within the construction which is highly thermoconductive, and thus provides for ready transmission of heat throughout much of the overall filter construction. As a result, thermal gradients are less likely to form within the construction, and system failure due to thermal shock is less likely to occur. More specifically, the presence of a good thermoconductor in the ceramic fiber filter construction helps ensure that heat applied to one portion of the construction will relatively rapidly be distributed throughout the construction, lessening the likelihood of damaging thermal shock.

Preferably, effective amounts of metal fiber materials are utilized as the heat conductor (or thermoconductive) component. In this context, the term "effective amount" is meant to refer to a sufficient amount of thermoconductive material such that the ceramic fiber construction is provided with substantially greater thermal conductivity therein, than in the absence of the component. Preferably, the material selected as the thermoconductive component has a thermal conductivity of at least about 5.0 Btu/ft hr °F. and more preferably at least about 8.0 Btu/ft hr °F. Hereinbelow, preferred constructions, and preferred amounts of thermoconductive component, are described.

Preferred media constructions according to the present invention comprise fiber filter constructions wherein the fiber component comprises the following, by weight:

(1) 50–98% ceramic fiber component;
(2) 10–50% fluid (glass) fiber component;
(3) 2–50% highly thermally conductive component.

When it is said, in this context, that the fiber component preferably comprises the above materials by wt-%, it is meant that of the total fiber presence, the components are as stated. There may, for example, be materials other than fiber materials in the filter construction. In certain most preferred applications, useful for applications as described herein, the only fibrous materials used are those as described above.

Preferably, the ceramic fiber component comprises alumino-silicate fiber material such as that described in Kusuda et al. '286. Most preferably, the material is such that at least 45% by weight of the ceramic fibers comprise alumina, the remaining typically including silica. Preferred such materials comprise 90–95% alumina, the remainder comprising silica ($SiO_2$) and borate ($B_2O_3$). Such materials may also include zirconia ($ZrO_2$) and/or chromia ($Cr_2O_3$) as minor components. Preferably, the material has a melting temperature higher than 1000° C., and more preferably greater than at least 1200° C.

For preferred applications as described herein, preferably the average fiber diameter of the ceramic fiber material is greater than about 1 micron and smaller than about 20 microns. Most preferably, it is in the range of about 3–5 microns. Such a fiber material is available (in bundle or bale form) from the following suppliers: Carborundum Company, Niagara Falls, N.Y. 14302 under the trade names fiberfrax and fibermax; ICI, The Heath, Runcon, England as Saffil; Nippon Steel Chemical Company, Tokyo, Japan as S-Fiber SC; and 3M, St. Paul, Minn. 55144 as Nextel.

The fluid fiber component, preferably comprising 10–50% by weight of the fibrous material in the filter media, is preferably a glass material which retains considerable strength at about 1000° F. (about 520° C.) or higher. Also, preferably the glass fiber average diameter is at least about 8–12 microns, and more preferably within the range of 8–12 microns. Such relatively large diameter fibers will add considerable strength to the fiber composite. A substantial stability at about 1000° F. (about 520° C.) or higher, will improve thermal stability of the fiber structure.

Preferably, the glass fiber component comprises reinforcing grade E glass fibers ($SiO_2$ 54%, $Al_2O_3$ 14%, $B_2O_3$ 10%, MgO 4.5%, CaO 17.5%) or high strength fiber grade S fibers ($SiO_2$ 65%, $Al_2O_3$ 25%, MgO 10%). A usable material is S-2 glass available from Owens Corning Fiberglass Company, Toledo, Ohio 43659.

The fiber component having high thermal conductivity is preferably a metallic component, and most preferably a relatively strong metallic component such as steel. The component preferably comprises about 2–50 percent by weight of the fiber content of the filter media. Preferably, the metallic fibers have an average fiber diameter of at least about 6–12 microns, and most preferably within that range. Preferred materials are stainless steel fibers, and steel alloy fibers. Acceptable materials are Bekipor, available from Bakaert Fiber Technologies, Belgium; and, Naslon, available from Nippon Seisen Company, Osaka, Japan.

Preferred filter fiber composites or constructions according to the present invention are prepared from all three fiber components described hereinabove, with the general exclusion of other fiber materials. However, in some applications it may be desirable to add other components, especially non-fiber ones, to the fiber construction, for example adhesives or various treatment materials. Some further discussion regarding this is provided hereinbelow.

Preferred filter media composites or constructions according to the present invention are prepared from the various fiber components through application of a wet-laying process. A wet-laying process, readily adaptable for use in preparing composites according to the present invention, is that described in Example 1 of Kusuda et al. U.S. Pat. No. 4,652,286, incorporated herein by reference. In general, the process is as follows:

The fiber components are dispersed in water. The components may be dispersed in separate batches later mixed, or in a single batch, with desirable results being obtainable in either instance. In general, it will be preferred to disperse each of the three components as separate batches which are then mixed together, to facilitate the dispersion process. Surfactants may be utilized to facilitate the dispersion. In general, dispersion can be effectively obtained when a ratio of about 100/1 of fiber/water (by weight) is used to form the dispersion, with agitation.

After all fiber components are dispersed in the same solution, the dispersion is deposited on a porous screen, to drain the aqueous phase away from the fiber mat. The result is a nonwoven mat having the three fiber components dispersed therethrough. The percent solidity, i.e., porous nature of the resulting filter mat, is controlled by the amount of water utilized in the dispersion, the fiber size and related factors, through applications of various conventional wet-laying techniques.

In some applications a temporary adhesive or binding agent, such as an organic binder, may be sprayed on the mat or added to the dispersion before draining. The use of such a temporary adhesive in the resulting nonwoven fiber mat will tend to help the arrangement maintain its integrity, making it easier to handle. The term "temporary" is used herein with respect to such agents, since they will tend to be oxidized off, or burned off, of the arrangement once the arrangement is subjected to relatively high temperature treatments or use. Hereinbelow it will be seen that certain typical, preferred, applications for composites according to the present invention will involve relatively high temperature gas filtering.

A nonwoven fiber mat prepared according to the above-described methods, involving filter media of the above-described composition, is a relatively easily handled and formed construction. Thus, it may be shaped in a variety of forms or configurations convenient for utilization as filter media. A preferred application according to the present invention is the preparation of a flexible, pleated, ceramic fiber filter construction. For preparation of such a system, the nonwoven fiber mat described above is pleated into a pleated construction using conventional pleating techniques, such as those applied for preparation of pleated paper filters. The result is a pleated construction, readily utilizable as a ceramic fiber filter arrangement.

A construction prepared according to the compositions and methods described hereinabove will generally be pliable, i.e., nonrigid, if it is prepared in the absence of material that would tend to lend rigidity to the system. More specifically, conventional ceramic fiber arrangements are prepared with the addition of fire clay to the composition, which upon firing renders a rigid, friable structure. The utilization of the glass component described herein lends strength to a system, facilitating preparation of the fiber construction in the absence of the clay component. Thus, constructions according to the present invention need not be fired, and need not be hardened upon application of heat thereto. A result is a relatively pliable or flexible construction. Such a construction is advantageous, for certain applications, for example because it can withstand stress and shock to significant degree, without damage. In addition, advantageous geometries, for example pleated arrangements, are readily made and applied. Certain advantageous applications of this are described hereinbelow.

B. Rigid Constructions

In the previous section, the construction of a relatively flexible arrangement, having improved characteristics, resulting from the utilization of glass and metal fibers with ceramic fibers was described. In some applications it will be desirable to apply certain principles of the present invention to obtain improved rigid filter constructions. As explained in the background section, rigid ceramic fiber constructions are well known. However, such constructions have, in general, not possessed acceptable or desirable characteristics with respect to strength, ability to withstand shock and vibration, integrity to temperature gradients applied thereto, and similar features. If such rigid arrangements are prepared from fiber mats involving glass (fluid) fiber components as described hereinabove and/or high thermal conductivity components as described hereinabove, improvement will result. Preferably, both such components are utilized in the fiber mat, from which the rigid construction is formed. Preferably, the ceramic fiber components, glass components and high thermal conductivity components are such as described hereinabove and are utilized in the same relative amounts.

In addition, preparation of a rigid construction will involve addition of fire clay to the system. In general, the fire clay will be added to the system when the fibers are dispersed, and prior to formation of the nonwoven fiber mat. Such a technique is, in general, a modification of the techniques described in Example 1 of Kusuda et al., U.S. Pat. No. 4,652,286, previously incorporated herein by reference. The principal difference between the procedure described in Example 1 of Kusuda et al. and the present application, concerns the nature of the fiber components in the dispersion. Preparation of such a rigid construction will involve a step of heat treatment, sintering or firing, after the nonwoven fiber mat with clay component therein has been molded or formed into the ultimate desired configuration. The net result is a rigid construction possessing certain improved characteristics.

A Preferred Element

The present invention includes within its scope preparation of a preferred ceramic fiber filter element. The versatility provided in ceramic fiber filter constructions, through application of the techniques of the present invention, allows for certain highly advantageous systems to be prepared and used. The arrangement depicted in FIGS. 1-3 reflects this.

In FIG. 1, reference numeral 1 generally designates a filter element or filter construction according to the present invention. The arrangement 1 is depicted in side cross-section in FIG. 2 and in longitudinal cross-section in FIG. 3. Referring to FIG. 1, element 1 comprises a cylinder 4 of pleated ceramic fiber filter material 5 extending between end caps 7 and 8. An optional central pleat spacer 10 is positioned intermediate end caps 7 and 8, to facilitate retention of the pliable pleats 12 of the pleated ceramic fiber filter media 5 in position with relatively even spacing.

Figure 2:
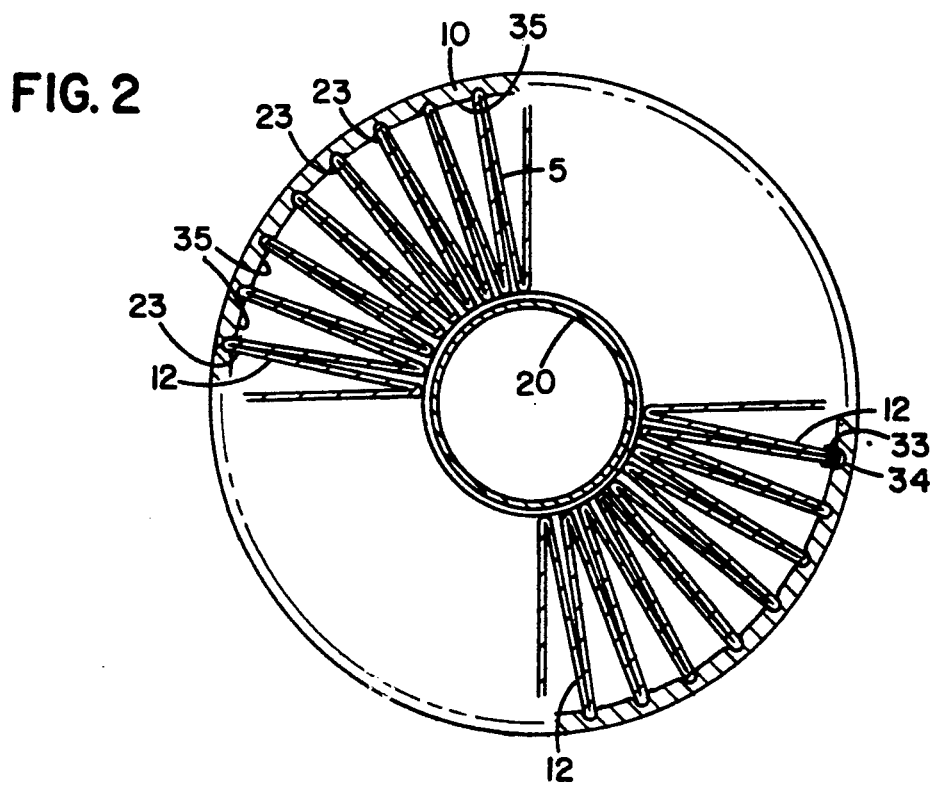
FIG. 2 is a cross-sectional view of the element shown in FIG. 1, taken a long line 2—2 thereof.

Typical utilization of the filter element 1 according to the present invention may be understood by reference to FIGS. 1 and 2. End cap 7 is provided with a central aperture 16 therein. End cap 8, on the other hand, completely encloses the arrangement 1. That is, there is no central aperture therein. The pleated ceramic fiber filter media 5 is permeable to gas (air) flow therethrough. The arrangement, therefore, may be utilized to filter material from a flowable medium (such as exhaust gas or air) by directing flow of the fluid or flowable medium with particulate material therein, into aperture 16 along the general direction of arrow 19, FIG. 1. That is, the gases are directed into a central flow channel 20, FIG. 3, received within (or defined by) cylinder 4. To flow outwardly from arrangement 1, since end 18 is closed by end cap 8, the gases must pass through the pleated ceramic fiber filter material 5, for example as illustrated by arrows 22. The particulate material within the gas will have been left along the internal surface 24, FIG. 3, of the pleated ceramic fiber filter material 5, i.e. it is left in region 20.

The arrangement of FIGS. 1-3 may be utilized with an opposite flow pattern; that is, with the air carrying particulate material directed against exterior surface 27, depositing particulate material thereon, and with the gas flow being inwardly to the internal flow chamber defined by cylinder 4, and outwardly through central aperture 16.

The arrangement of FIGS. 1-3 is a surface filter, not a depth filter. That is, the particulate material is left (primarily) on the surfaces defined by the pleats 23. The pleated construction is advantageous, since it provides for a relatively large filter surface area. In general, a large surface area filter construction is advantageous, for a variety of reasons. For example, since the particulate material is deposited upon the surface, rather than deeply within the fibers, regeneration through removal of the particulate materials from the filter media is facilitated. Particular advantage with respect to this will be described hereinbelow.

Further, such systems generally allow for a relatively high particulate holding capacity with a relatively low pressure drop across the system with typical gas filtration velocities. Thus, they do not operate to impede, substantially or undesirably, gas flow outwardly from an upstream system.

Such an arrangement is particularly advantageous for use in systems involving substantial vibration, shock, thermal gradient or wide temperature swings. The reasons for this include that the non-rigid, pleated, ceramic fiber filter material is free to expand and contract with temperature swing. It is not brittle, so it can withstand shock readily. The individual fibers within the fiber mat can move relative to one another, since they are not fixed in position by clay or the like.

Preferably the pleated ceramic fiber filter material 5 of the arrangement shown in FIGS. 1-3 is a flexible material prepared as described hereinabove and including ceramic fiber, fluid fiber and heat conductor fiber material therein. Preferably the end caps 7 and 8 are metal caps (for example stainless steel) with the pleated ceramic filter potted therein with an inorganic potting compound suitable for relatively high temperature applications (i.e. preferably up to at least about 1000° C.).

In many applications, it will be desirable to provide the pleated ceramic fiber filter media 5 with adjacent liner material, to facilitate integrity of the filter element 1. The arrangement shown in FIGS. 1-3 is preferably provided with both an internal liner 30 and an external liner 31, see FIG. 4 an enlarged view of several pleats 23. The liners 30, 31 are not shown in detail in FIGS. 1-3 since they are thin layers adjacent the fiber filter material 5. In the enlargement of FIG. 4, they are readily viewable, however.

Preferably, each of liners 30 and 31 comprises a very porous, screen-like material which provides some strength and integrity to the system, for example to resist bowing or bulging of the pleated ceramic filter material (depending upon the direction of fluid flow) under pressure. While a variety of materials maybe be utilized as the liners 30 and 31, it is foreseen that in typical applications as described hereinbelow an effective, desirable, material will be a metal screen, provided with a protective, noncorrosive coating. A usable material is stainless steel screen. Alternative materials include woven cloth. The internal liner 30 and external liner 31 need not be of the same material. In some applications, it may be desirable only to have one liner, i.e., only an internal liner 30 or only an external liner 31.

Referring to FIG. 1, cylinder 4 comprises a substantially continuous extension of pleated ceramic fiber filter material 5. Such an arrangement is formed from a sheet of flexible pleated fiber filter material, rolled into a cylinder shape and provided with a seam 33, FIG. 2. The seam 33 may be provided in a variety of manners including by sewing edges of the ceramic fiber filter material together, or providing a clamp. The arrangement shown in FIGS. 1-3 includes a clamp 34, which retain ends or edges of the sheet of pleated ceramic fiber filter material 5 together.

As generally indicated above, for pleated ceramic fiber filter elements it is generally preferred that pleat spacing be maintained relatively uniform and constant. For the arrangement shown in FIGS. 1-3 this is facilitated by pleat spacer 10. Pleat spacer 10 comprises a ring construction including a plurality of spacers 35 oriented between adjacent pleats 12 to maintain spacing. A pleat spacer 10 may be utilized within cylinder 4, instead of externally thereto. In addition, spacers may be utilized both externally and internally. In particularly long arrangements, it may be desirable to utilize more than one, laterally spaced, pleat spacer.

In addition to the pleat spacer helping retain positioning between the pleats 12, the potting material at end caps 7 and 8 will also facilitate such a retention.

Hereinbelow, filter elements 1 according to the present invention are described in a particular field of use, i.e., as filter elements in particulate traps for diesel exhaust systems, such as used in trucks and buses. Such systems are exposed to very wide temperature swings, throughout the lifetime of installation. For example, if one considers installation of such a system in an over the highway truck, the system will be exposed to very cold temperatures in the winter, when the truck is not operating; and, relatively hot temperatures (at least about 600° C.) in use, when the diesel engine is producing large amounts of hot exhaust. Such extreme temperature swings can cause considerable expansion and contraction of components from which filter element 1 is constructed. When constructed from fiber materials as described hereinabove, the pleated ceramic fiber filter material 5 is somewhat stable to wide swings of temperature. However if the filter material 5 is utilized in a construction 1, FIGS. 1-3, adjacent an internal liner 30 or external liner 31, or both, (which are also likely to expand or contract substantially under temperature ranges, but to a different extent than the filter material 5) the liners 30 and 31 may tend to cause buckling of the pleated ceramic fiber filter material 5 upon thermal expansion/contraction. This could lead to filter damage, and possible loss of filter integrity.

It is foreseen that especially when internal liner 30 and external liner 31 are formed from metal, substantially greater expansion of the liners 30 and 31 will likely take place, upon application of substantial heat, than will occur with respect to the pleated ceramic fiber filter material 5. In constructions according to FIGS. 1-3, several particular modifications may be utilized, to inhibit the likelihood of damage through such thermal expansion.

First, it is not always necessary that the liners, for example external liner 31, FIG. 2, be anchored or secured to (or at) both end caps 7 and 8; i.e. at both ends. If the liner is anchored only at one end, and not at the other, longitudinal expansion of the liner will not necessarily stress the two end caps 7 and 8 apart (which could damage the filter). Thus, longitudinal expansion of the liner 30, 31 is in part accommodated by not anchoring the liner 30, 31 to both end caps 7 and 8 (or to the pleated ceramic fiber filter material 5 at both ends).

Another method or technique by which problems with respect to thermal expansion can be inhibited or limited, will be understood by reference to FIG. 4. For the arrangement shown in FIG. 4, wire screen liner 36 is an external liner 31, FIG. 3. However, the technique may be applied with respect to internal liners as well.

The wire screen liner 36, FIG. 4, is oriented so that the longitudinal extension of its longitudinal wires 37 is not parallel (and for cross wires 38 not perpendicular) to the extension of pleats 12 (or pleat ridges). Rather, it is oriented so that its longitudinal wires 37 (and also cross wires 38) extend at about 45°, i.e. at acute angles, to the extension of pleats 12 (or pleat ridges). Since, in general, the direction of greatest expansion (or contraction) for wire screen liner 36 will be in the general directions of the longitudinal extensions of its wires, such an orientation will tend to reduce the amount of longitudinal expansion stress applied to pleated ceramic fiber filter material 5, upon expansion/contraction of the screen liner 36.

Use as a Filter In a Filter Regeneration System

The principles of the present invention were developed in part to provide for an advantageous filter element for use in systems involving regeneration. In particular, they were developed with respect to use as filter elements in exhaust particulate traps, wherein regeneration is effected by application of heat to cause oxidation of the trapped particular material. In FIG. 5 a particular embodiment of filter elements generally corresponding to filter element 1, FIGS. 1-3, is shown. Versatility of pleated ceramic fiber filter material 5 (preferably made according to the principles of the present invention) will be further understood from this description.

In general, the application of FIG. 5 concerns utilization of a filter element according to FIGS. 1-3 in a system which, periodically, will be heated substantially by an electric heater element, to cause oxidation of soot or other particulate material trapped against the filter element. For the descriptions of FIG. 5, it will be assumed that the filter element is to be utilized in a system involving flow first into aperture 16, FIG. 1, and outwardly through the pleated ceramic fiber filter material 5. That is, the soot or particulate material is deposited along internal filter surfaces in region 20, FIG. 2, of the pleated ceramic fiber filter material.

Attention is first directed to the arrangement 50 illustrated in FIG. 5. FIG. 5 is a cross-sectional schematic view, showing internal structure. The arrangement 50 of FIG. 5 generally comprises a filter element 51 analogous to filter element 1, FIG. 1. It comprises end caps 52 and 53 with a cylinder 54 of pleated ceramic fiber filter material 55 extending therebetween. Preferably pleated ceramic fiber material 55 comprises a material according to the preferred formulation described herein.

Cylinder 54 defines internal flow passageway 60. Direct flow into or from passageway 60 is provided by aperture 61 in end cap 52. By "direct" in this context it is meant flow without passage through the filter element. End cap 53 completely encloses arrangement 51, i.e. it does not have an aperture extending therethrough.

For periodic, selective, regeneration of filter element 51 in use, a heater arrangement or assembly 65 is positioned within passageway 60. Heater assembly 65, for the embodiment of FIG. 5, comprises an expanded metal screen 66 which, when electrical current is applied thereto, will sufficiently heat for initiation of the oxidative regeneration process. Screen 66 comprises a cylindrical structure spaced from and positioned out of direct contact with, metal components in end caps 52 and 53, and pleated fiber filter material 55, by insulating spacers 68. Electrical communication with screen 66 can be provided from a remote source by wires, as shown at 69.

In some applications, particularly ones wherein the longitudinal extension of the filter element is not that great, it will not be necessary for the heater assembly 65 to extend the complete length of the extension of the pleated ceramic fiber filter material.

From the above descriptions with respect to FIG. 5, the general versatility of systems according to the present invention for application in particulate traps to be regenerated, will be appreciated. A wide variety of variations can be tolerated, in part due to the flexibility allowed by the generation of a strong, effective, flexible, ceramic fiber filter material, especially one that can be generated in a pleated form.

Application In A Diesel Engine Particulate Trap

Figure 6:
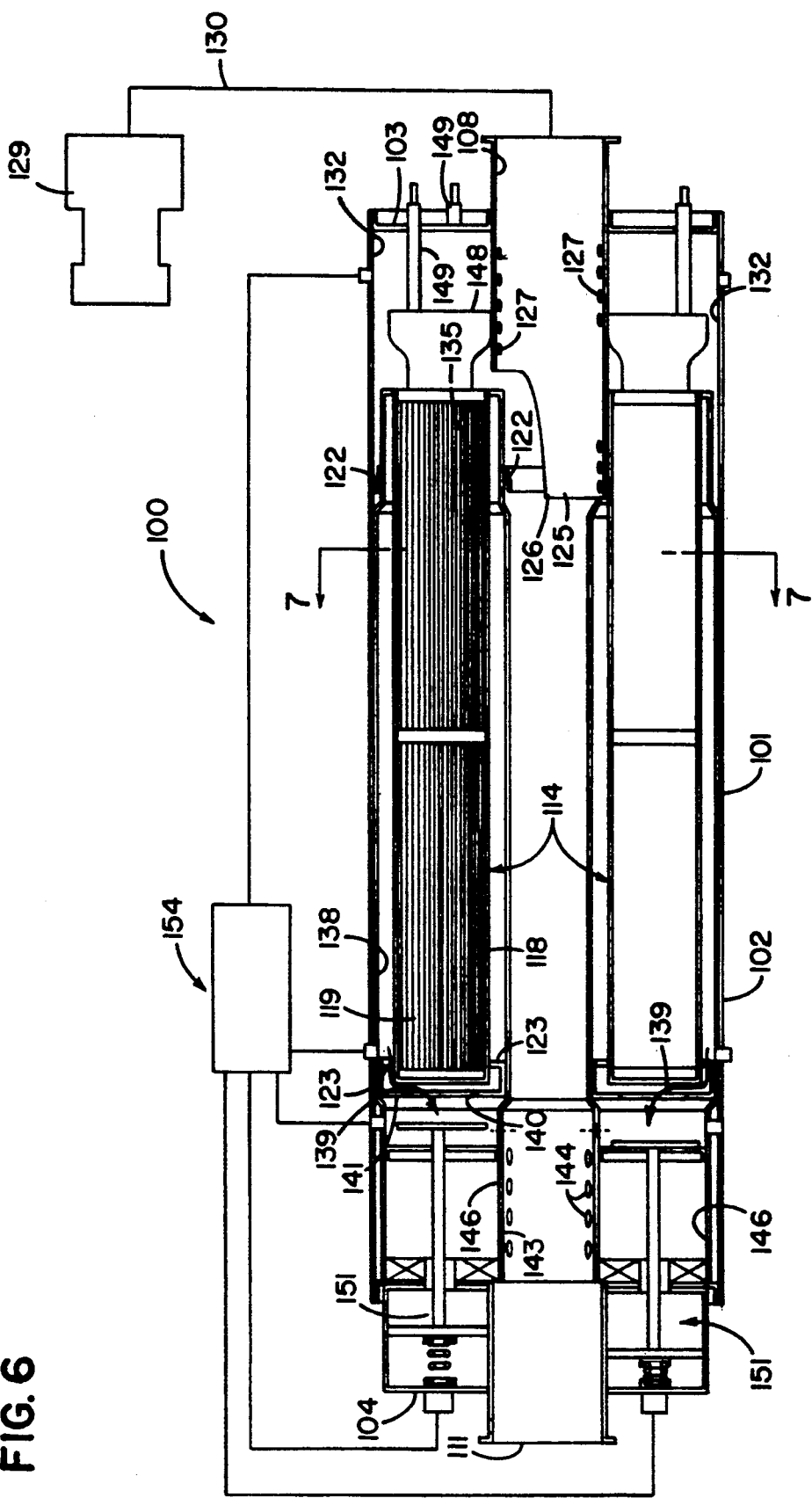
FIG. 6 is a schematic cross-sectional view of a particulate trap including a filter element according to the present invention therein.

As indicated previously, the techniques, principles, compositions and constructions of the present invention were developed in part to provide for advantageous diesel engine particulate trap filters. Utilization of the present invention according to the present invention in such a filter is illustrated in FIG. 6. The arrangement illustrated in FIG. 6 is depicted without certain construction details to facilitate an understanding and emphasis on those features which concern filter elements according to the present invention.

Referring to FIG. 6, muffler-filter apparatus 100 includes a housing 101 comprising an elongated curved wall 102 with opposite end walls 103 and 104. An inlet tube 108 extends into the housing 101 at a central location, through end wall 103. Outlet tube 111 extends at a central location through opposite end wall 104.

The apparatus 100 of FIG. 6 involves utilization of four filter tube modules 114. This will be better understood by reference to the cross-sectional view of FIG. 7. Each module 114 includes therein a filter element 118. Filter elements 118 may be in general analogous to filter element 1, FIG. 1. That is, preferably they each include a pleated ceramic fiber filter material 119 therein prepared according to the principles of the present invention and preferably comprising a composite including ceramic fibers, glass fibers and metal fibers according to preferred embodiments of the present invention.

Figure 7:
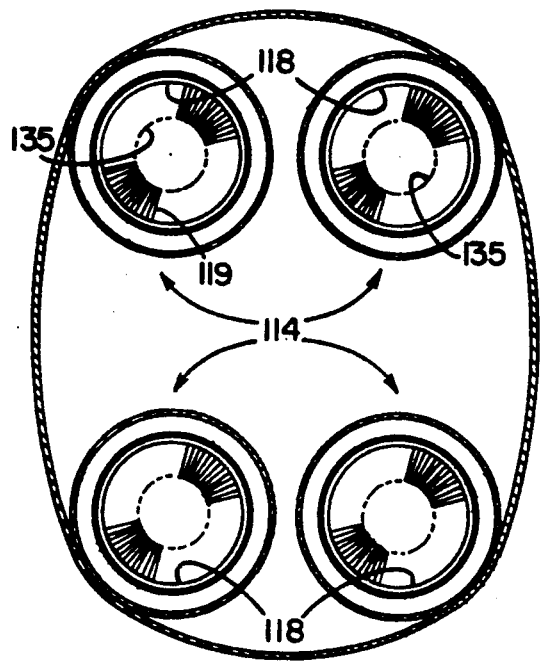
FIG. 7 is an enlarged cross-sectional view taken generally along line 7—7, FIG. 6.

For the embodiment shown in FIGS. 6 and 7, four filter tube modules 114 are installed within housing 101 in a generally symmetric arrangement. Modules 114 are supported at opposite ends by support plates 122 and 123.

Inlet tube 108 has choke 125 at end 126 thereof. Inlet tube 108 is perforated, to allow exhaust gases to be forced through the perforations 127 and through the filter modules 114, as described hereinbelow.

Typical flow path through the system, of exhaust gases, for filtering is as follows. The gases leave engine 129 and are directed as shown by path 130 into inlet tube 108. The gases can pass outwardly through perforations 127 into region 132. This allows for some sound muffling, as region 132 can be constructed as a resonance chamber. The gases are then directed into central passageways 135 in each of the filter tube modules 114. Central passageways 135 generally correspond to passageways 20, FIGS. 1-3. That is, the gases are directed to the central passageways 135 by passage through an aperture defined by an end cap. The gases are then directed outwardly from the interior of each filter module 114 to a region 138 defined therearound. Regions 138 are readily definable by internal baffle and wall structures in the apparatus 100. The gases within regions 138 are directed, as indicated by arrows 139 to aperture 140 and valve seat 141. After the gases pass through valve seat 141 they are directed to outlet tube 143. Apertures 144 in outlet tube 143 allow expansion of the gases into resonance chamber 146 for further sound attenuation. The gases then pass through outlet 111 from the exhaust muffler arrangement.

Each filter tube module 114 is provided with an internal heater arrangement 148 operated via control line 149. The heater arrangement in each filter tube module 114 may be as previously described with respect to FIG. 5; however alternate constructions may be used. In typical applications each of the heater arrangements and each filter tube module can be independently controlled. Each of the four valve seats 141 is selectively opened and closed via an associated poppet valve assembly 151.

In use, when it is believed that, or determined that, any particular filter tube module 114 is in need of regeneration, the poppet valve assembly 151 associated with the filter tube module 140 will be operated to close the outlet aperture 114 associated therewith. Thus, exhaust flow through the associated filter tube module is substantially inhibited. The heater arrangement associated with that filter tube module is then energized, to oxidize particulate material trapped along the inside of the associated pleated ceramic fiber filter material. Oxidation air can be provided by allowing some leakage through the system, or through introduction of air via separate lines. When the system is substantially regenerated, the associated poppet valve assembly can then be reopened to allow the particular filter tube module 114 regenerated to be put back on line for operation. In a system such as that shown in FIG. 6, involving four separate filter tube modules, by staggering the period of regeneration for any given filter tube module with a period of regeneration for the other filter tube modules, high efficiency of operation with little down time can be obtained.

A variety of overall control means may be utilized for detection of need for regeneration and control of the poppet valve assemblies and other components in the system. Detailed description with respect to this is not provided herein. In general, the control assembly is indicated at 154. It may be an on board system if the diesel engine is involved in vehicle use. In a typical application, the need for regeneration of any given filter tube module will be determined by assessing the pressure drop thereacross. In particular, more and more soot is collected in the filter tube module, the pressure drop across the filter will increase. At a predetermined level, the system can be closed and regenerated.

Some Alternate Systems A. A Single Filter Element

Figure 8:
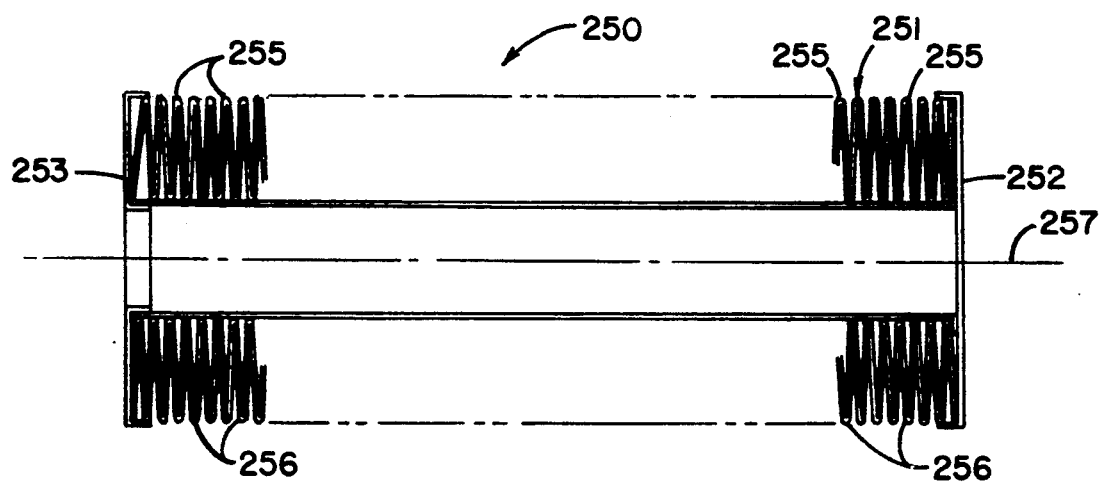
FIG. 8 is a cross-sectional view of an alternate filter element according to the present invention.

The versatility the present invention provides with respect to construction of ceramic fiber filters allows for some unique applications not previously readily achieved for example, a selected portion of the filter element may be regenerated while "on-line" (or in use), by exposure to heat. Thus a construction having a single filter element is feasible. Such an arrangement would have a heater element that could be selectively directed at only certain portions of the filter element, for regeneration. B. An Alternate Orientation of the Pleats Since the present invention provides for the construction of flexible pleats involving ceramic fibers, a variety of alternate filter constructions are conceivable. An example of this is illustrated in FIG. 8. In FIG. 8 a filter arrangement 250 is illustrated comprising filter member 251 extending between endcaps 252 and 253. Filter arrangement 251 is oriented with a plurality of pleats 255 in a manner orthogonal (at right angles) to that shown in the illustration of FIG. 1. In particular, pleats 255 are oriented with ridges 256 thereof extending generally around, and oriented in a plane perpendicular to, central longitudinal axis 257. The arrangement shown in FIG. 8 will be generally referred to herein as a "bellows" or "accordion" arrangement, due to the orientation of the pleats generally orthogonal to longitudinal extension of the filter. Such an arrangement can readily expand or contract along the longitudinal axis 257, to advantage.

C. Extension of a Pliable Filter Material Among Guides

Figure 10:
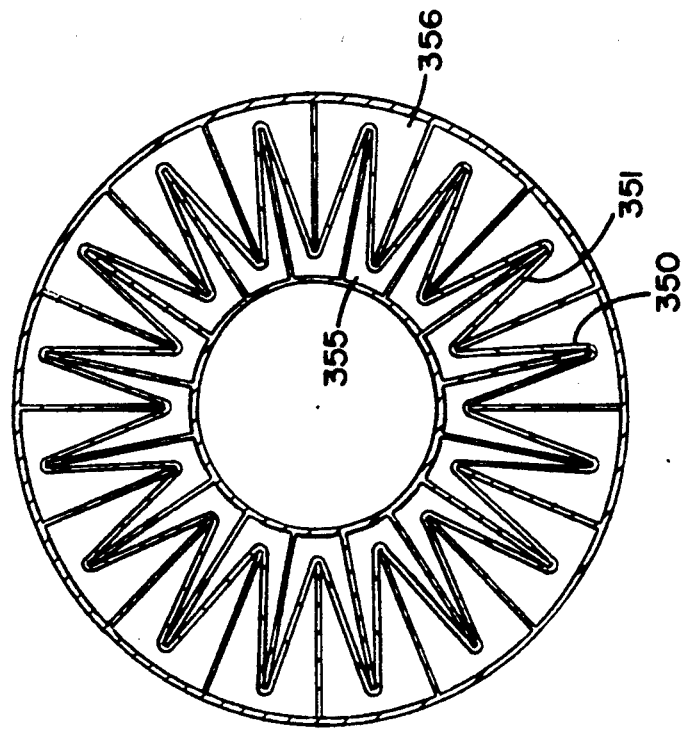
FIG. 10 is a schematic cross-sectional view of still another alternate embodiment.
Figure 9:
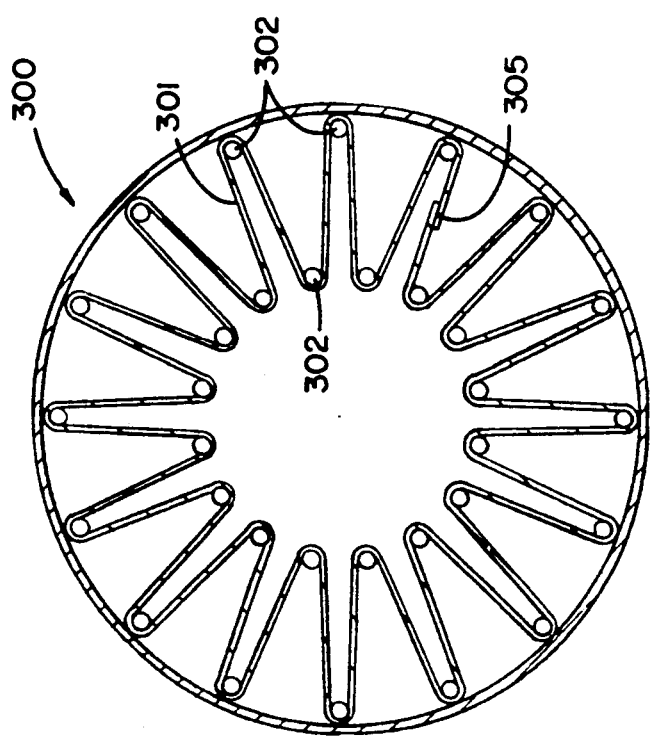
FIG. 9 is a schematic cross-sectional view of an alternate embodiment.

Flexible, or pliable, filter media according to the present invention can be extended through a variety of systems of varying configurations. In FIG. 9, one is illustrated at 300 wherein a flexible sheet of media 301 is wound (or threaded) around a series of support rods 302, to form a filter. At seam 305, edges of the sheet are joined. In FIG. 10, a sheet 350 of media 351 is positioned between two forms, 355 and 356 respectively, to construct filter arrangement 360.

What is claimed is:

1. A filter element comprising:
  (a) a longitudinal extension of pleated fiber media including, by weight % of total fiber material present:
    (i) 50-98% ceramic fiber material;
    (ii) 10-50% glass fiber material; and,
    (iii) 2-50% metallic fiber material having a thermoconductivity of at least 5.0 Btu/ft hr °F.;
  (b) said ceramic fiber material, said glass fiber material and said metallic fiber material being mixed together in said pleated fiber media such that individual fibers of said ceramic fiber material, said glass fiber material and said metallic fiber material are dispersed throughout said fiber media; and,
  (c) said longitudinal extension of flexible fiber media comprising a cylindrical extension having external and internal surfaces and comprising a plurality of longitudinal pleats defining an internal flow passageway.

2. A filter element according to claim 1 including a porous support liner oriented adjacent said external surface of said cylindrical extension.

3. A filter element according to claim 2 wherein said porous support liner comprises a wire screen having a plurality of parallel longitudinal wires; said wire screen being oriented with said longitudinal wires generally extending at an acute angle to said cylindrical extension of pleats.

4. A filter element according to claim 1 including a porous support liner oriented adjacent said internal surface of said cylindrical extension.

5. A filter element according to claim 1 wherein:
  (a) said cylindrical extension has first and second ends; and,
  (b) said construction includes a first end cap on said cylindrical extension first end and a second end cap on said cylindrical extension second end.

6. A filter element according to claim 5 including a pleat spacer positioned between said first and second end caps.

7. A filter element according to claim 1 wherein said ceramic fiber material comprises a non-fired, pliable, non-rigid construction.

8. A filter element according to claim 1 wherein:
  (a) said ceramic fiber material contains an amount of fire clay therein effective to render a rigid construction upon firing; and,
  (b) said ceramic fiber material comprises a fired, rigid, construction.

9. An exhaust system particulate trap assembly for filtering exhaust gas from a diesel engine; said assembly including:
  (a) a filter element comprising:
    (i) a longitudinal extension of pleated fiber media including, by weight % of total fiber material present: 50-98% ceramic fiber material; 10-50% glass fiber material; and, 2-50% metallic fiber material having a thermoconductivity of at least 5.0 Btu/ft hr °F.;
    (ii) said ceramic fiber material, said glass fiber material and said metallic fiber material being mixed together in said pleated fiber media such that individual fibers of said ceramic fiber material, said glass fiber material and said metallic fiber material are dispersed throughout said fiber media; and,
    (iii) said longitudinal extension of flexible fiber media comprising a cylindrical extension having external and internal surfaces and comprising a plurality of longitudinal pleats defining an internal flow passageway; and,
  (b) means for directing exhaust gas flow through said filter element.

10. An exhaust system particulate trap assembly according to claim 9 including:
  (a) a heater assembly having a heater element positioned within said internal flow passageway.

11. A filter element comprising:
  (a) an extension of pleated fiber filter media comprising by weight of total fiber material present:
    (i) 50-98% ceramic fiber material;
    (ii) 10-50% glass fiber material; and,
    (iii) 2-50% metallic fiber material;
  (b) said ceramic fiber material, said glass fiber material and said metallic fiber material being mixed together in said pleated fiber media such that individual fibers of said ceramic fiber material, said glass fiber material and said metallic fiber material are dispersed throughout said fiber media.

12. A filter element according to claim 11 wherein said ceramic fiber material comprises a non-fired, pliable non-rigid construction.

13. A filter element according to claim 11 wherein:
  (a) said ceramic fiber material contains an amount of fire clay therein effective to provide a rigid construction upon firing; and,
  (b) said ceramic fiber material comprises a fired, rigid, construction.

* * * * *